F. PODSIAD.
BARREL ASSEMBLING MACHINE.
APPLICATION FILED AUG. 11, 1920.
1,398,737.
Patented Nov. 29, 1921.
3 SHEETS—SHEET 1.
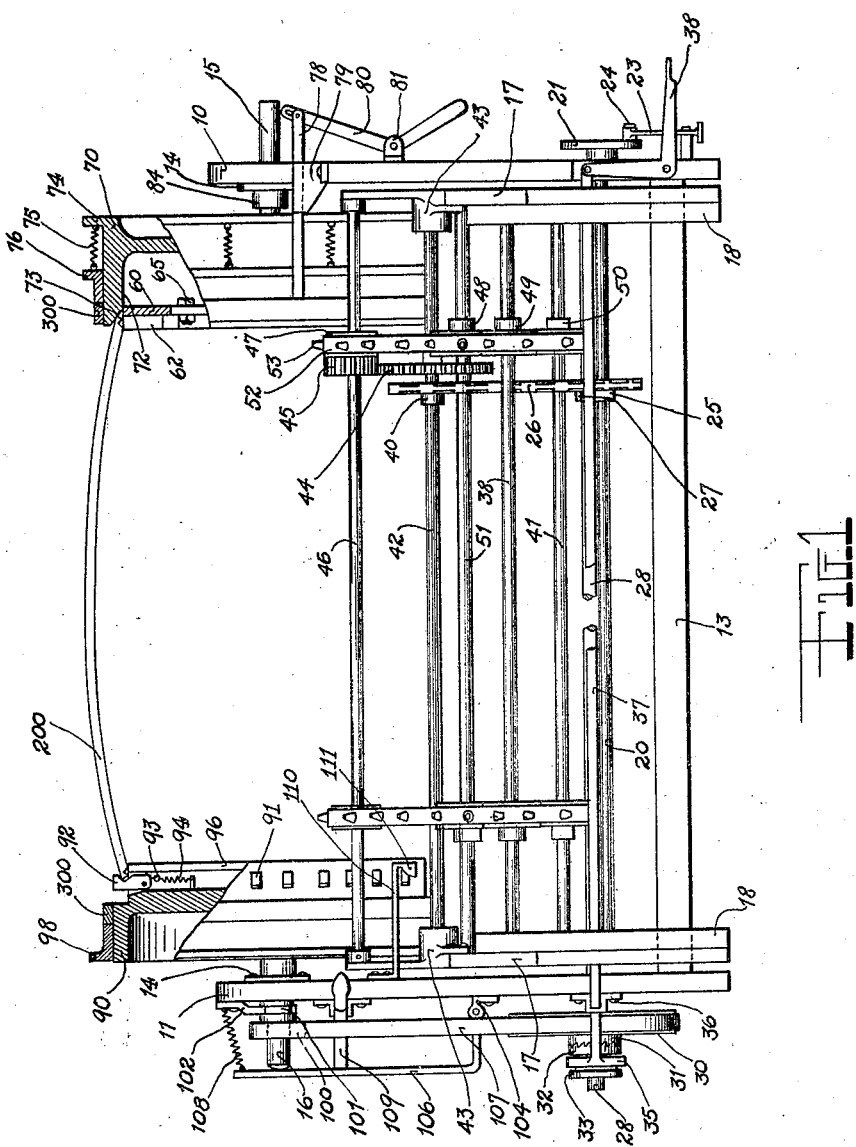
INVENTOR
Frank Podsiad
BY
ATTORNEY F. PODSIAD.
BARREL ASSEMBLING MACHINE.
APPLICATION FILED AUG. 11, 1920.
1,398,737.
Patented Nov. 29, 1921.
3 SHEETS—SHEET 2.
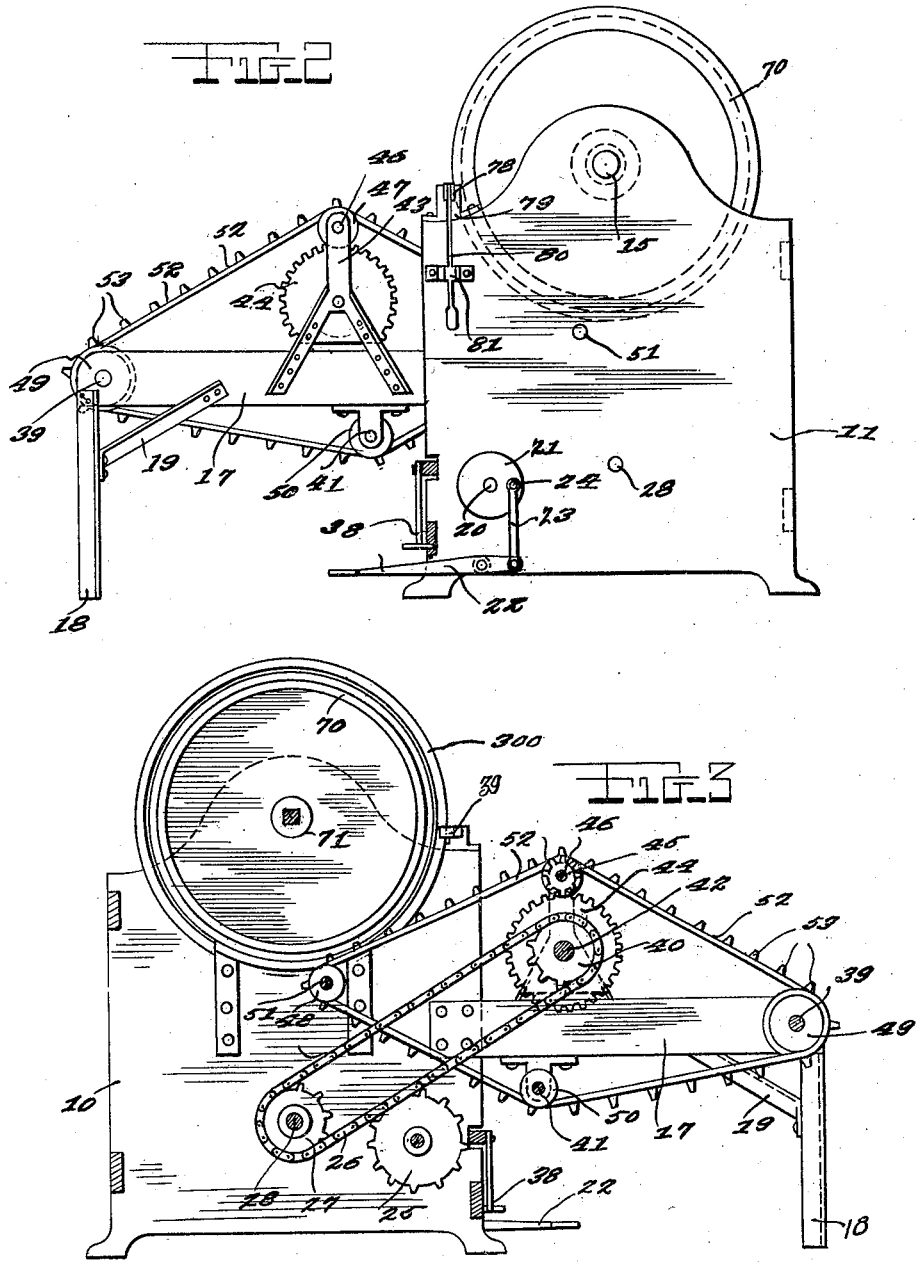

F. PODSIAD.
BARREL ASSEMBLING MACHINE.
APPLICATION FILED AUG. 11, 1920.
1,398,737.
Patented Nov. 29, 1921.
3 SHEETS—SHEET 3.
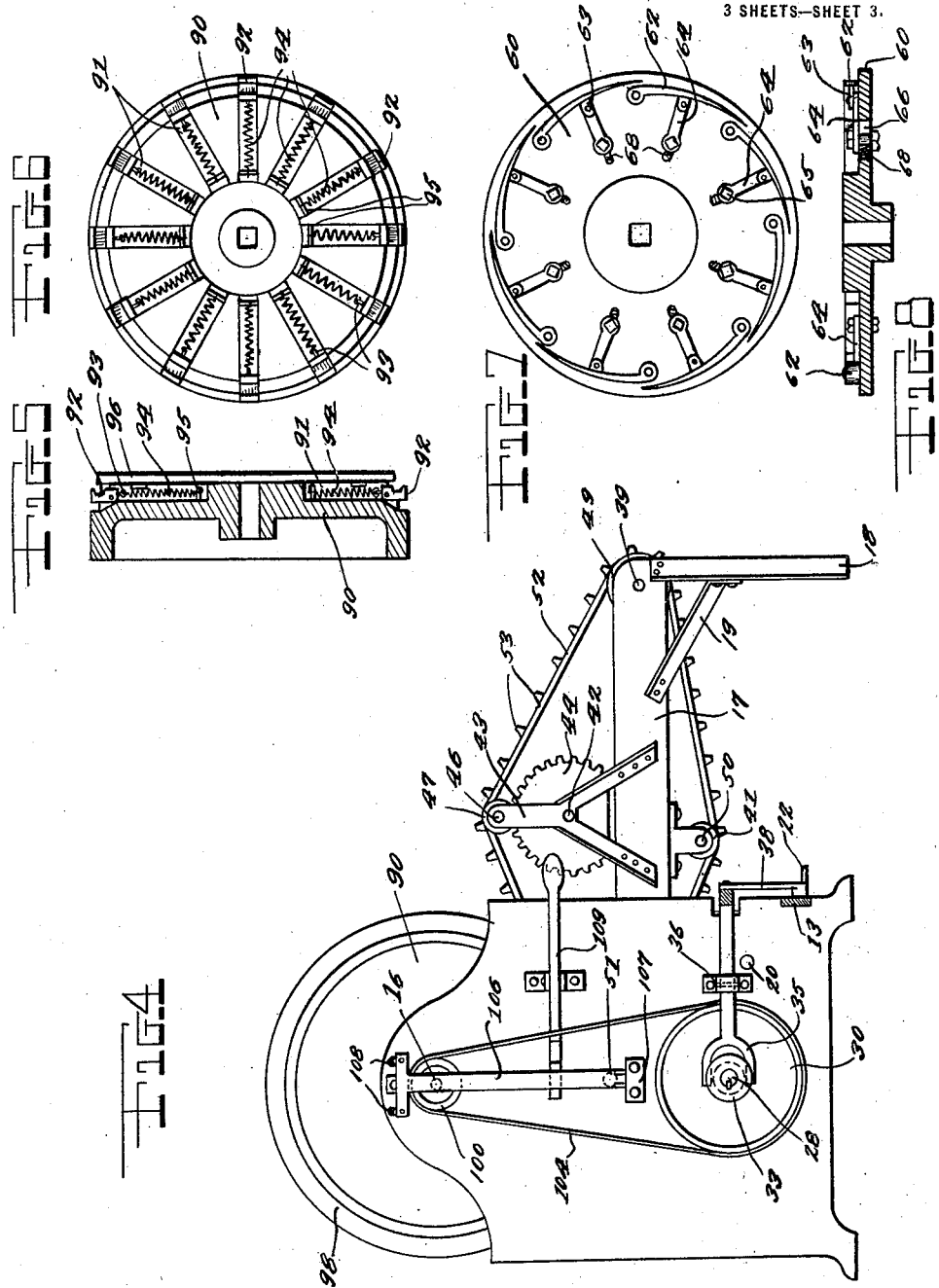

UNITED STATES PATENT OFFICE.

FRANK PODSIAD, OF WYANDOTTE, MICHIGAN.

BARREL-ASSEMBLING MACHINE.

1,398,737.　　　　　Specification of Letters Patent.　Patented Nov. 29, 1921.

Application filed August 11, 1920. Serial No. 402,781.

*To all whom it may concern:*

Be it known that I, FRANK PODSIAD, a citizen of Poland, residing at Wyandotte, in the county of Wayne and State of Michigan, have invented certain new and useful Improvements in Barrel-Assembling Machines, of which the following is a specification.

The manifest object of this invention is to provide a machine for assembling barrels, designed in a manner assuring a high degree of utility and efficiency combined with relatively low cost of manufacture.

This and other objects are attained by the novel construction and arrangement of parts described in the specification and shown in the accompanying drawings, forming a material part of this disclosure, and in which:—

Figure 1 represents a front elevational view of the machine.

Fig. 2 is an end view of the right hand side of the machine.

Fig. 3 is a vertical transverse sectional view taken substantially on the line 3—3 of Fig. 1, but with disk 60 (see Figs. 1, 7 and 8,) omitted.

Fig. 4 is an elevational view of the left hand side of the machine.

Fig. 5 is a cross sectional view of the left hand drum.

Fig. 6 is a side view of the same with the cover disk removed.

Fig. 7 is a similar view of the right hand drum clamping disk.

Fig. 8 is a cross sectional view of the same.

Referring to the drawings in detail, the numerals 10 and 11 generally represent the right and left hand side frames of the machine and are connected one to the other by rails 13 forming rigid cross bars therewith. Located at an upper central position of the side frames are bearings 14 adapted to rotatably and slidably engage the short shafts 15 and 16 respectively. Attached to the side frames 10 and 11 are forwardly extending arms 17 to which are connected legs 18 rigidly held by braces 19.

Located near the lower front corners of the side frames 10 and 11 are annular bearings through which a drive shaft 20 is rotatably journaled. A disk crank 21 is secured upon the extending right end of the shaft, rotation being effected through operation of a treadle 22 pivotally secured to the frame and connected to the disk by a link 23 turning on a crank pin 24.

Secured to the shaft 20 approximately halfway between the center of the machine and the right hand frame is a sprocket 25 drivably engaging the lower side of a chain 26, in mesh with another sprocket 27 fixed to a shaft 28 journaled in bearings provided through the side frames and extending beyond the left hand bearing providing space for a pulley 30 rotatably retained on the shaft and having a hub provided with serrations forming a clutch element 31 adapted to engage a similar element 32 provided with a hub portion 33 slidably secured to the shaft 28 and having an annular recess thereon adapted to engage a forked lever 35 pivotally secured to the side frame in a forked bracket 36, a rear portion of the lever being pivotally connected to an operating bar 37 passing longitudinally of the machine and actuated by a bell crank foot lever 38 attached to the right hand frame.

A sprocket 40 in line with the sprocket 27 and operable by the chain 26, is secured to a shaft 42 positioned longitudinally of the machine and rotatably journaled in bearings 43 attached to the frame arms 17, to the right of the sprocket 40 is secured a spur gear 44 in mesh with a pinion 45 fixed to a rotatable shaft 46 journaled in bearings formed in the extended arms of the element 43.

Secured to the shaft 46 closely adjacent the pinion 45 is a wide faced sprocket wheel 47 in toothed engagement with a conveyer belt 52 having on the outer face projecting carrying hook elements 53, the belt being guided and controlled by the flanged wheels 48, 49 and 50 secured to the shafts 51, 39 and 41 respectively, the shaft 39 being held rotatably in bearings provided in the forward extending ends of the arms 17.

At approximately an equal distance from the center of the machine to the left is arranged a similar conveyer system to which no further reference being made numerals are omitted.

Secured to the inner end of the shaft 15 is a disk element 60, and pivotally attached thereon near the outer edge are a plurality of arcuately shaped clamps 62 having centrally positioned clip elements 63 engaging radially disposed links 64 secured to the disk by bolts 65 passing slidably through radially positioned slots 66 formed through the disk, outward movement of the clamps being effected by means of compression springs 68 acting between the bolts 65 and the inner ends of the slots 66; said shaft 15 also carrying a drum generally designated by the numeral 70 comprising a hub 71 secured to the shaft 15, an annularly bored recess 72 receptive of the disk 60, an extending beveled rim 73 engageable with a stave 200 and a flange 74 the inner side provided with an annular row of hooks adapted to engage the looped ends of a plurality of coiled tension springs 75 the opposite ends engaging by similar manner hooks provided in the side of an annular flanged ring 76 slidably mounted on the drum 70. A bar 78 is slidable within a bracket 79 attached to the frame 10, the inner end being provided with a forked head adapted to engage the flange of the sliding ring 76 imparting a parallel reciprocating movement thereto by the action of the lever 80, pivotally connected to the outer end of the bar 78 and centrally pivoted within a slotted lug 81 attached to the frame 10.

The action of the lever 80 through the bar 78 slides the ring 76 forward forcing the hoop 300 from the drum onto the assembled staves.

A collar 84 on the shaft 15 prevents the drum combination from moving outwardly.

At the opposite end of the machine secured to the inner end of the shaft 16 is a drum 90 the inner side having a plurality of radial slots 91 in which at the outer ends are pivoted gripping dogs 92 adapted to engage with stave ends, and at lower end, off center with respect to the pivotal point, are hooks 93 engaging springs 94 the opposite ends being attached to pins 95 near the inner ends of the slots 91.

A disk 96 adjacent the face of the drum 90 serves as a cover over the slots, while the peripheral edge provides a stop on which the stave ends rest.

An annular flanged ring 98 is slidably mounted on the face of the drum 90 in a manner adapted to force a hoop 300 from the drum over the dogs and onto the assembled staves, this movement being accomplished by means of a lever operated bar, not shown in the drawings but similar to the arrangement before described and located at opposite end of machine.

Slidably keyed to the shaft 16 is a pulley 100 having a grooved hub 101 engaged by forked elements 102 compelling alinement with the pulley 30 at all times, a belt 104 transmitting motion between the shafts 16 and 28 causing the left hand drum to rotate.

An angularly bent bar 106 pivoted in a bracket 107 attached to the frame 11 extends upward, the end being provided with means for securing thereto a tension spring 108 the other end being fixed to the frame, and the force of the spring against the end of the shaft 16 causes the shaft and drum to move inwardly preventing the staves from dropping out of place before the hoops are pressed over them.

A lever 109 is provided for manually releasing the pressure on the shaft when removing an assembled barrel.

Attached to the inner side of the frame 11 is an arm 110 provided with a cam head element 111 formed to engage the dogs 92 in passing, the action forcing back the pivoted dogs and allowing a stave to be positioned as the dog passes from engagement with the cam, the springs 94 pulling the dogs into normal position against the periphery of the disk 96 and the angular notches of the dogs receiving the ends of the staves.

The machine as described is of simple construction hand and foot operated, staves being placed upon the conveyer, are carried backward to the assembling drums, the right hand end being placed between the spring clamps and the conical edge of the drum while the hooks on the opposite drum are opened successively by cam 111 allowing the stave to be entered and held, this cycle of operation being repeated until the required number of staves have been assembled.

Levers such as 80 on being manipulated, force the hoops onto the stave ends and the barrel may then be removed.

A clutch is provided so that the drum may be rotated to adjust or remove a defective stave, without movement of the conveyer.

Having thus described my invention, what I claim as new and desire to secure by Letters Patent, is:—

The combination in a barrel assembling machine having rotatable drums, of means for supporting hoops thereon, belt driven means for conveying staves to the drum, and means for securing staves upon the drums, said means consisting of spring controlled notched gripping dogs radially disposed within the drums, their notches engaging the ends of the staves and means for shifting each hook in succession to admit the end of a stave.

In testimony whereof I affix my signature.

FRANK PODSIAD.